Patented Feb. 16, 1954

2,669,548

UNITED STATES PATENT OFFICE 2,669,548

STABILIZED HALOGEN-CONTAINING RESINS

Joseph R. Darby, Richmond Heights, and Leo D. Frederickson, Jr., St. Louis, Mo., assignors to Monsanto Chemical Company, St. Louis, Mo., a corporation of Delaware No Drawing. Application January 2, 1951, Serial No. 204,092

16 Claims. (Cl. 260—23)

This invention relates to the stabilization of halogen-containing resin compositions. More particularly this invention relates to preventing the deterioration of halogen-containing resins at elevated temperatures.

As is well known to those skilled in the art, halogen-containing resins and particularly halogen-containing vinylidene resins are subject to deterioration on exposure to elevated temperatures. Numerous materials have been suggested for incorporation in such resins to prevent or minimize such deterioration. However, relatively few of these stabilizing agents have proved to be particularly effective.

It is an object of this invention to provide halogen-containing resin compositions having improved resistance to deterioration on aging. A further object of this invention is to provide halogen-containing vinylidene resin compositions having increased resistance to deterioration at elevated temperatures. A particular object of this invention is to provide vinyl chloride polymer compositions having increased heat stability.

According to the present invention, halogen-containing resin compositions having improved stability are attained by incorporating in a halogen-containing resin a mixture of a zinc salt and a calcium chelate derivative of a 1,3-dicarbonylic compound capable of keto-enol tautomerism.

The following examples are illustrative of the invention but are not to be considered as limitative thereof. Where parts are mentioned, they are parts by weight.

The compositions in the examples set forth in Table I below are prepared by mixing 100 parts of polyvinyl chloride with zinc stearate and calcium ethyl acetoacetate in the amount set forth together with 50 parts of 2-ethyl hexyl diphenyl phosphate. The several ingredients are mixed on differential speed rolls at a roll temperature of 160° C. to form homogeneous compositions which are removed from the rolls in the form of rough sheets. From these sheets are molded finished sheets which are about 0.020 inch in thickness using the molding cycle of 3 minutes at 160° C. and about 4000 pounds per square inch pressure.

The heat stability values expressed in terms of color are obtained by heating the molded sheets at 160° C. for the indicated periods of time. Initially the sheets in Examples I–VII are substantially colorless.

TABLE I

| Example | Zinc Stearate (Parts) | Calcium Ethyl-acetoacetate (Parts) | Color After 60 Minutes at 160° C. |
|---|---|---|---|
| I | 0.1 | 3 | Slight yellow. |
| II | 0.2 | 3 | Very slight yellow. |
| III | 0.3 | 3 | Do. |
| IV | 0.5 | 3 | Do. |
| V | 0.9 | 3 | Do. |
| VI | 0.2 | 5 | Slight yellow tinge. |
| VII | 0.5 | 1 | Very slight yellow. |

The unexpected and meritorious nature of applicant's compositions as exemplified by Examples I–VII is clearly evident when it is considered that on repeating Example II except that the calcium compound is omitted, the product turns dark brown after only 40 minutes at 160° C. In further contrast to the compositions of the invention, a product identical with that of Examples I–V except that the zinc salt is omitted is brown in color after 60 minutes at 160° C.

Results similar to those attained in Examples I–VII are attained on substituting zinc octate in the same amounts for the zinc stearate in the foregoing examples.

In the same manner as in the examples in Table I, the compositions of the examples in Table II below are prepared and tested for heat stability. In Table II, the plasticizers employed are designated by the letters A, B, C and D which stand for, respectively, 2-ethylhexyl diphenyl phosphate, butyl phthalyl butyl glycolate, dioctyl phthalate and tricresyl phosphate.

Initially, the sheets in Examples VIII–XIV are substantially colorless.

As in the case of Examples I–VII, each of the compositions in Examples VIII–XIV contains 100 parts of polyvinyl chloride in addition to the components set forth in Table II.

TABLE II

| Example | Plasticizer | Zinc Stearate (Parts) | Calcium Ethyl Acetoacetate (Parts) | Color After 60 Minutes at 160° c. |
|---|---|---|---|---|
| VIII | A—33.4 parts / B—16.6 parts | 0.2 | 3.0 | Very slight yellow. |
| IX | A—33.4 parts / B—16.6 parts | 0.2 | 5.0 | Do. |
| X | A—33.4 parts / B—16.6 parts | 0.5 | 3.0 | Do. |
| XI | C—50.0 parts | 0.5 | 3.0 | Do. |
| XII | D—50.0 parts | 0.5 | 3.0 | Do. |
| XIII | B—50.0 parts | 0.2 | 3.0 | Slight yellow. |
| XIV | B—50.0 parts | 0.5 | 3.0 | Very slight yellow. |

As indicated by the stability results, the compositions of Examples VIII–XIV are comparable in stability to those of Examples I–VII.

In contrast to the stability of the product of Example VIII, when the zinc salt is omitted the result is a product which develops a deep color on heating for 60 minutes at 160° C. In contrast to the product of Example XI, omission of the calcium compound results in a product which turns black on 20 minutes heating at 160° C. and omission of the zinc salt results in a product which develops a deep color on heating under the same conditions.

The compositions of the examples in Table III below are prepared and treated in the same manner as in the case of the previous examples. In Example XV the plasticizer is 50 parts of butyl phthalyl butyl glycolate and in Examples XVI–XXI 50 parts of 2-ethylhexyl diphenyl phosphate for each 100 parts of polyvinyl chloride. The amounts of the zinc and calcium salts are also based on 100 parts of polyvinyl chloride.

TABLE III

| Example | Zinc Salt | Parts | Calcium Ethyl Acetoacetate (Parts) | Color After 60 Minutes at 160°C. |
|---|---|---|---|---|
| XV | Zinc Acetate | 0.5 | 3.0 | Very slight yellow. |
| XVI | Zinc Stearate | 0.5 | 2.0 | Do. |
| XVII | Zinc Oleate | 0.5 | 2.0 | Do. |
| XVIII | Zinc Ricinoleate | 0.5 | 2.0 | Do. |
| XIX | Zinc Carbonate | 0.5 | 3.0 | Slight yellow. |
| XX | Zinc Benzoate | 0.5 | 3.0 | Very slight yellow. |
| XXI | do | 1.0 | 3.0 | Do. |

As in the case of the previous examples, the products of Examples XV–XXI are substantially colorless prior to the heat stability test as can be seen.

*Example XXII*

A plasticized composition containing 100 parts of a copolymer of 90 parts vinyl chloride and 10 parts vinyl acetate is stabilized by incorporating therein a mixture of 3 parts calcium ethyl acetoacetate and 0.5 part zinc stearate. The resulting composition possesses improved heat stability characteristics as compared with unstabilized material similar to those of the product of Example IV.

*Example XXIII*

Results similar to those obtained in Example XXII are obtained when the copolymer of vinyl chloride and vinyl acetate therein is replaced by an equal amount of a copolymer of 90 parts vinyl chloride and 10 parts vinylidene chloride.

*Example XXIV*

A mixture of 100 parts of a copolymer of 90 parts vinyl chloride and 10 parts diethyl maleate, 50 parts of 2 ethyl hexyl diphenyl phosphate, 3 parts of calcium ethyl acetoacetate and 0.5 part zinc stearate is processed into homogeneous molded sheets as in Example IV. The resulting product exhibits a heat stability comparable to that of the product of Example IV.

As indicated by Examples I–XXIV, it is found that surprisingly effective stabilizing results are obtained according to the invention with halogen containing resins generally, numerous examples of which are well known to those skilled in the art. Thus, there may be employed resins made from such vinylidene compounds as vinyl chloride, vinylidene chloride, vinyl chloracetate, chloro styrenes, chloro butadienes, etc. Such vinylidene compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, paraethyl styrene, divinyl benzene, vinyl naphthalene, alpha-methyl styrene; dienes, such as butadiene, unsaturated amides, such as acrylic acid amide, acrylic acid anilide; unsaturated nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of vinyl halides, e. g., vinyl chloride with α,β-unsaturated polycarboxylic acids such as diethyl maleate or other esters of maleic, fumaric, aconitic, itaconic acids, etc. Among the preferred esters of such acids are alkyl esters in which the alkyl group contains not over eight carbon atoms.

The stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride, chlorinated natural and synthetic rubbers, rubber hydrochloride, etc.

The stabilizer mixture of the invention is also effective in halogen-containing resins containing halogens other than chlorine, e. g., bromine, fluorine and iodine.

The halogen-containing resins may contain a varying proportion of halogen depending upon the nature of the resin and its contemplated use. However, as indicated above, vinyl chloride polymers in which the proportion of vinyl chloride units amounts to 50% or more of the total monomer used in making the polymeric product represents a preferred class of polymers to be stabilized according to the invention.

The amounts of the components of the stabilizer combination of this invention may be substantially varied and still result in surprising improvement in stability of the halogen containing resin. Usually at least one part by weight of the calcium compound is used in stabilizing 100 parts by weight of a halogen containing resin and generally from 2 to 10 parts by weight are preferred. The use of less than one part by weight is effective to a considerable degree and amounts larger than 10 parts may be used although further improvement in stability of the resulting compositions is not in direct proportion to the amount used.

Usually the amount of the zinc salt is smaller than that of the calcium compound. Extremely small amounts of the zinc salt have a noticeable effect on the stability but usually at least 0.05 part by weight for every 100 parts by weight of halogen containing resin is employed and preferably from 0.1 part to 0.5 part. Amounts larger than 0.5 part may be employed but generally speaking, it is not advantageous to incorporate more than 1-2 parts of the zinc salt.

Various zinc salts may be employed in the stabilizer combination of the invention, for example, zinc salts of organic acids, as well as zinc salts of inorganic acids which give a neutral or alkaline reaction in an aqueous medium, i. e., zinc salts of weak inorganic acids. Examples of zinc salts of organic acids which may be employed are those made from such acids as saturated aliphatic acids, e. g., ethanoic, propanoic, butanoic, pentanoic, hexanoic, hepanoic, octanoic, nonanoic, decanoic, hendecanoic, dodecanoic, tetradecanoic, hexadecanoic and octadecanoic; mono-olefinic-unsaturated aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 7-hexadecenoic acid, 10-undecenoic acid, 13-docosenoic acid, 3-hexenoic acid, and 9-octadecenoic acid; diolefinic-unsaturated aliphatic acids such as 2,4-pentadienoic acid, 2,4-hexadienoic acid, 3,7-dimethyl-2,6-octadienoic acid, 9,12-octadecadienoic acid; triolefinic-unsaturated aliphatic acids such as 3,7-dimethyl-2,4,6-octatrienoic acid, 9,12,15-octadecatrienoic acid, 9,11,13-octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; acetylenic unsaturated aliphatic acids such as propynoic, butynoic, pentynoic, amyl propynoic, 7-hexadecynoic, 9-octadecynoic and 13-docosynoic acids.

Mixtures of aliphatic acids may be employed, as for example, mixtures of acids occurring in various oils, as for example, linseed, castor, tung, soya bean, perilla, corn, cotton seed, sunflower, safflower, sesame, poppy seed, walnut, peanut, olive, rape seed, whale, dehydrated castor, palm kernel, cocoanut oil and the like.

Other zinc salts of organic acids may also be used such as zinc salts of aliphatic polycarboxylic acids, e. g., zinc salts of maleic, succinic, adipic and sebacic acids, etc., as well as polycarboxylic acids obtained by polymerization of unsaturated fatty acids, e. g., oleic acid dimer and linoleic acid dimer; salts of aromatic acids, e. g., zinc salts of phenyl-acetic, benzoic, phthalic and salicylic acids; salts of cyclic acids, e. g., the zinc salt of abietic acid.

The zinc salts may be either neutral or basic salts when monocarboxylic acids are used. Mixed salts made from mixtures of acids may also be used.

As examples of zinc salts of weak inorganic acids are zinc salts of carbonic, silicic, boric acids and the like.

Of the various zinc salts which may be used in the stabilizer combination of the invention, a preferred class comprises those made from saturated monocarboxylic aliphatic acids containing at least 10 carbon atoms, e g., 10 to 24 carbon atoms such as those mentioned above.

The calcium chelates which are used in the stabilizer combination of the invention are calcium chelates of derivatives of 1,3-dicarbonyl compounds capable of keto-enol tautomerism such as beta-diketones, beta-ketoacids and the esters of beta-ketoacids.

A preferred class of such calcium compounds are the calcium chelates of ethyl acetoacetate, butyl acetoacetate, 2-ethylbutyl acetoacetate, 2-ethylhexyl acetoacetate, N-octyl acetoacetate, phenylacetoacetate, benzyl acetoacetate, phenylethyl acetoacetate, tolyl acetoacetate as well as other aliphatic and aromatic esters of acetoacetic acid. However the calcium chelate of the free beta-keto acids such as acetoacetic acid, etc., may be used. Examples of calcium chelates of diketones include those made from acetyl acetone, benzyl acetone, diacetyl acetone and the like.

The stabilizer combination of the invention is of particular importance in stabilizing halogen-containing resins especially vinyl chloride polymers plasticized with phosphate esters such as the alkyl diaryl phosphates in which the alkyl group contains 6–14 carbon atoms and the aryl groups are phenyl or cresyl groups, i. e., ortho-, meta- or paracresyl groups and mixtures thereof since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually however, from 10 to 100 parts of the esters are used for every 100 parts of vinyl chloride-containing resin.

A particular feature of vinyl chloride polymer compositions of the invention plasticized with certain of the phosphate esters set forth above, is their non-toxicity. Thus, in contrast to prior stabilizers, the stabilizer combination of the invention is non-toxic. Thus, by virtue of the present invention compositions are provided which may be processed, e. g., by calendering into thin films without undue discoloration thereof and the resulting films used in the packaging of food and other uses where toxic effects must be avoided.

As indicated by the examples, plasticizers other than alkyl diaryl phosphate esters may be employed as well as mixtures of such phosphate esters and such conventional plasticizers as dioctyl phthalate, tricresyl phosphate, butyl phthalyl butyl glycolate, etc. In the case of certain halogen-containing resins no plasticizers are required.

In addition to the stabilizer combination of the invention, other heat stabilizers and also light stabilizers may be included, if desired, examples of which are well known to those skilled in the art as well as other conventional additives such as other resins, lubricants, coloring materials, etc.

The foregoing description is given in illustration and not in limitation of the invention as set forth in the appended claims.

What is claimed is:

1. A composition resistant to the discoloring effects of heat comprising 100 parts by weight of a halogen-containing resin and as a stabilizer therefor a mixture of 0.05 to 2 parts by weight of a zinc salt from the group consisting of zinc salts of organic acids and zinc salts of inorganic acids which give a non-acidic reaction in an aqueous medium and 1 to 10 parts by weight of a calcium chelate derivative of a 1,3-dicarbonylic compound capable of keto-enol tautomerism, the quantity of said zinc salt being smaller than the quantity of the said calcium chelate.

2. A composition as defined in claim 1 in which the halogen is chlorine.

3. A composition as defined in claim 1 in which the calcium chelate derivative is calcium ethyl acetoacetate.

4. A composition resistant to the discoloring effects of heat comprising 100 parts by weight of a halogen-containing vinylidene resin and as a stabilizer therefor a mixture of 0.1 to 0.5 parts by weight of a zinc salt of an organic acid and 2 to 10 parts by weight of a calcium chelate derivative of a 1,3-dicarbonylic compound capable of keto-enol tautomerism.

5. A composition as defined in claim 4 in which the halogen is chloride.

6. A composition as defined in claim 4 in which the zinc salt is a zinc salt of a monocarboxylic saturated aliphatic acid containing at least 10 carbon atoms.

7. A composition as defined in claim 4 in which the resin is a vinyl chloride polymer.

8. A composition as defined in claim 4 in which the resin is polyvinyl chloride.

9. A composition as defined in claim 4 in which the resin is a vinyl chloride-vinyl acetate copolymer.

10. A composition as defined in claim 4 in which the resin is a vinyl chloride-diethyl maleate copolymer.

11. A heat resistant composition comprising 100 parts by weight of a vinyl halide polymer and as a stabilizer therefor a mixture of 0.1 to 0.5 parts by weight of zinc stearate and 2 to 10 parts by weight of calcium ethyl acetoacetate.

12. A heat resistant composition comprising 100 parts by weight of a vinyl chloride polymer and as a stabilizer therefor a mixture of 0.1 to 0.5 parts by weight of zinc stearate and 2 to 10 parts by weight of calcium ethyl acetoacetate.

13. A heat resistant composition comprising 100 parts by weight of polyvinyl chloride, a phosphate ester plasticizer and as a stabilizer therefor a mixture of 0.1 to 0.5 parts by weight of zinc stearate and 2 to 10 parts by weight of calcium ethyl acetoacetate.

14. A composition as defined in claim 13 in which the phosphate plasticizer is an alkyl diaryl phosphate in which the alkyl group contains from 6 to 14 carbon atoms and the aryl radical is taken from the group consisting of phenyl and cresyl radicals.

15. A composition as defined in claim 12 in which the polymer is a vinyl chloride-vinyl acetate copolymer.

16. A composition as defined in claim 12 in which the polymer is a vinyl chloride-diethyl maleate copolymer.

JOSEPH R. DARBY.
LEO D. FREDERICKSON, Jr.

References Cited in the file of this patent

UNITED STATES PATENTS

| Number | Name | Date |
| --- | --- | --- |
| 2,307,075 | Quattlebaum et al. | Jan. 5, 1943 |
| 2,457,035 | Darby | Dec. 21, 1948 |
| 2,564,646 | Leistner et al. | Aug. 14, 1951 |

FOREIGN PATENTS

| Number | Country | Date |
| --- | --- | --- |
| 908,027 | France | Mar. 28, 1946 |